(12) United States Patent
Bertola

(10) Patent No.: US 10,690,188 B2
(45) Date of Patent: Jun. 23, 2020

(54) FLEXIBLE CAGE FOR ROLLING BEARING

(71) Applicant: Aktiebolaget SKF, Gothenburg (SE)

(72) Inventor: Maurizio Bertola, Turin (IT)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 16/121,209

(22) Filed: Sep. 4, 2018

(65) Prior Publication Data
US 2019/0195282 A1 Jun. 27, 2019

(30) Foreign Application Priority Data

Dec. 22, 2017 (IT) .......................... 102017000148587

(51) Int. Cl.
| | |
|---|---|
| *F16C 33/41* | (2006.01) |
| *F16C 33/38* | (2006.01) |
| *F16C 19/18* | (2006.01) |
| *F16C 43/08* | (2006.01) |

(52) U.S. Cl.
CPC ........ *F16C 33/3825* (2013.01); *F16C 19/184* (2013.01); *F16C 33/416* (2013.01); *F16C 43/083* (2013.01); *F16C 19/186* (2013.01); *F16C 2326/02* (2013.01)

(58) Field of Classification Search
CPC .............. F16C 33/3825; F16C 33/3812; F16C 33/40–416
See application file for complete search history.

(56) References Cited

U.S. PATENT DOCUMENTS

| | | | | | |
|---|---|---|---|---|---|
| 1,654,101 | A | * | 12/1927 | Styri ....................... | F16C 33/41 384/525 |
| 2,566,421 | A | * | 9/1951 | Lapointe ................. | F16C 19/10 29/898.067 |
| 5,957,592 | A | * | 9/1999 | Yamanaka ............. | B62K 19/34 384/526 |
| 9,677,614 | B2 | * | 6/2017 | Varnoux ................ | F16C 33/416 |
| 9,709,096 | B2 | * | 7/2017 | Varnoux ................ | F16C 33/416 |
| 2009/0046969 | A1 | * | 2/2009 | Hirai ..................... | B60B 27/0084 384/544 |
| 2014/0054102 | A1 | * | 2/2014 | Adane .................. | F16C 33/3887 180/443 |
| 2016/0319875 | A1 | | 11/2016 | Sguotti et al. | |

FOREIGN PATENT DOCUMENTS

| | | |
|---|---|---|
| EP | 1847725 B1 | 8/2015 |
| FR | 3001511 A1 | 8/2014 |

* cited by examiner

*Primary Examiner* — Phillip A Johnson
(74) *Attorney, Agent, or Firm* — J-Tek Law PLLC; Scott T. Wakeman; Mark A. Ussai

(57) ABSTRACT

A flexible cage of a rolling bearing belonging to a wheel hub assembly for motor vehicles, having a substantially circular rib and a plurality of fingers which extend from a side of the rib and have a base portion, the rib and the fingers having partially spherical concave surfaces defining together a plurality of partially spherical cavities for retaining respective rolling bodies. The rib has substantially straight portions, each of them integrally connected to a base portion of a finger, substantially oblique portions and protrusion portions.

5 Claims, 5 Drawing Sheets

FLEXIBLE CAGE FOR ROLLING BEARING

CROSS-REFERENCE

This application claims priority to Italian patent application no. 102017000148587 filed on Dec. 22, 2017, the contents of which are fully incorporated herein by reference.

FIELD OF THE INVENTION

The present invention is particularly suitable, although not exclusively, for the wheel hub assemblies of motor vehicles, the assemblies are being provided with a rolling bearing. These applications comprise both the case where the outer ring of the bearing is rotating, while the inner ring of the bearing is fixed, and the opposite case where the inner ring rotates and the outer ring is fixed. The invention is also suitable for any type of rolling body (balls, rollers, tapered rollers, etc.). In particular, the present invention relates to an innovative cage for the rolling bodies of the bearings. This invention is applicable, advantageously but not exclusively, to a bearing unit having a double row of balls.

BACKGROUND

In order to understand better the present state of the art and the problems associated with it, a cage for rolling bodies of the known type will be first described. With reference to FIGS. 1-5, a conventional cage 10 is formed by a circular base rib 11 and a plurality of circumferentially spaced fingers 12 which extend from a side of the rib 11, where the fingers 12 have a base portion 12a. The base rib 11 and the fingers 12 have partially spherical concave surfaces 14, 15, 16 defining together a plurality of partially spherical pockets or cavities 13 for retaining balls (20 or 21 in FIG. 5).

The rib 11 is a continuous structural element which extends circumferentially along the cage and forms a solid base so as to provide the cage overall with the necessary rigidity for keeping the balls of each row circumferentially equally spaced along the raceways of a bearing.

In a bearing with a double row of balls (FIG. 5), the ribs 11 of the two cages are positioned on either side with a small amount of axial play in the middle. In many applications, a bearing of this type must be axially compact. For this purpose, it has been proposed in the past manufacturing a single cage forming two rows of pockets on opposite sides thereof for two respective rows of balls. Although a reduction in the axial mass is achieved, owing to the presence of a single rib instead of two, this cage has not produced satisfactory results. As is known to persons skilled in the art, in certain working conditions, the two rows of balls of a bearing of the above type roll at different speeds owing to non-symmetrical loads acting on the bearing. In these conditions, the aforementioned single cage forces the two rows of balls to rotate at the same speed. Consequently, an excessive amount of contact (and therefore a considerable degree of friction) arises between the balls and the pockets of the cage. In the long run this results in melting of the surfaces of the pocket.

In order to solve this problem, a different cage has been proposed in EP1847725. With reference to FIG. 6, which also relates to the prior art, in a cage for ball bearings 10, a plurality of circumferentially spaced fingers 12 extend from a first side of the cage. The fingers have concave surfaces 15, 16 which form a corresponding plurality of pockets 13 for containing the balls. Each pocket 13 is defined by the concave surfaces 15, 16 of two consecutive fingers 12 and forms part of a spherical surface S. The fingers 12 have base portions 12a joined together by a continuous circular rib 11. The rib 11 extends circumferentially in a radially inner position with respect to the base portions 12a and does not project axially substantially beyond a radial plane P tangential to the spherical surfaces S on a second side of the cage opposite to the first side. This solution, although constituting an improvement with respect to the preceding solutions and reducing the friction between the cage and rolling bodies, has been unable to obtain the desired reduction of the friction.

The known solutions moreover, on some occasions, do not allow the cages to be mounted from the same side of the bearing, since the cage to be positioned in a position at a distance from the mounting side has to pass through shoulders which may be present on one of the rings of the bearing and which thus prevent the cage from passing through during the assembly operations.

There therefore exists the need to design a cage for rolling bearings which does not have the aforementioned drawbacks. In particular, there exists the need to reduce further the frictional force which arises between the cage and the rolling bodies and to allow mounting of the cages from the same side of the rolling bearing.

BRIEF SUMMARY OF THE PRESENT INVENTION

One object of the present invention is to define a so-called flexible cage for rolling bearings of wheel hub assemblies which ensures at the same time both retention of the rolling bodies of the row, reducing as far as possible the friction between the cage and the rolling bodies, and an equally spaced arrangement of the rolling bodies.

According to another object this novel so-called flexible cage is able to be deformed during the process of assembly on the wheel hub assembly.

With this solution it is possible to avoid a specific design of the bearing for wheel hub assemblies, namely the need to produce a different design of the cages of the axially inner row and axially outer row, for assembly thereof and/or because of dimensional constraints.

Being able to use the same design both for the axially inner cage and for the axially outer cage means that the two rows of rolling bodies may have the same number of rolling bodies and the same rolling diameter, thus improving the load capacity of the bearing.

Moreover this novel flexible cage ensures, during rotation of the bearing, a reduction in the contact area and therefore the friction between the rolling bodies and the surfaces of the cages which retain the rolling bodies, as well as an equally spaced arrangement of the rolling bodies.

Therefore, according to the present invention, a flexible cage made of plastic material and intended for a bearing unit of a wheel hub assembly is described, the cage being configured so that, after molding and during assembly on the bearing, its maximum overall diameter may be reduced by applying an external circumferential force. In this way, therefore, it is possible to overcome the dimensional constraints which may exist during mounting. After correct positioning of the cage inside the bearing, the removal of the circumferential force has the effect that the cage returns to its correct shape and is ready to receive the rolling bodies, using the standard mounting procedure. This flexible cage has the characteristic features described as follows:

a substantially circular rib; and a plurality of fingers extending from a side of the rib and have a base portion, the rib and the plurality of fingers have partially spherical concave surfaces defining together a plurality of partially spherical cavities, each partially spherical cavity of a size and shape to retain a respective rolling body, wherein the substantially circular rib includes substantially straight portions, each substantially circular rib is steadily connected to a base portion of a respective finger of the plurality of fingers, substantially oblique portions and protrusion portions.

In another aspect, the substantially oblique portions and protrusion portions are positioned along the rib according to a predetermined series of elements, wherein a first element of the predetermined series of elements includes a first straight portion is steadily connected to a first oblique portion of the oblique portions, the first oblique portion is steadily connected to a respective protrusion portion of the protrusion portions, the respective protrusion portion is steadily connected to a second oblique portion of the oblique portions and the second oblique portion is steadily connected to a second straight portion which starts a new element of the series of elements.

In yet another aspect, the flexible cage is configured in such a way that, during the assembly inside a radially outer ring of the rolling bearing, a circumferentially external force applied to the fingers of the rib reduces a diameter ($\Phi$) of a circumference (C) circumscribing the cage to a value lower than a minimum diameter (DK) of the radially outer ring.

In yet another aspect, a wheel hub group for motor vehicles, comprising a hub and a rolling bearing, the rolling bearing comprising:

a radially outer ring provided with respective radially outer raceways;

a radially inner ring provided with respective radially internal raceways; and two rows of rolling bodies positioned between the corresponding internal and external raceways, the group being characterized in that the two rows of rolling bodies are held in position by corresponding flexible cages, wherein each flexible cage comprises:
a substantially circular rib; and
a plurality of fingers extending from a side of the rib and have a base portion, the rib and the plurality of fingers have partially spherical concave surfaces defining together a plurality of partially spherical cavities, each partially spherical cavity of a size and shape to retain a respective rolling body,
wherein the substantially circular rib includes substantially straight portions, each substantially circular rib is steadily connected to a base portion of a respective finger of the plurality of fingers, substantially oblique portions and protrusion portions.

In yet another aspect, a method for assembling a flexible cage inside a rolling bearing belonging to a wheel hub group for motor vehicles, the flexible cage comprising:
a substantially circular rib; and
a plurality of fingers extending from a side of the rib and have a base portion, the rib and the plurality of fingers have partially spherical concave surfaces defining together a plurality of partially spherical cavities, each partially spherical cavity of a size and shape to retain a respective rolling body, and wherein the substantially circular rib includes substantially straight portions, each substantially circular rib is steadily connected to a base portion of a respective finger of the plurality of fingers, substantially oblique portions and protrusion portions, the wheel hub group comprising:
a hub and a rolling bearing in turn comprising:
a radially outer ring provided with respective radially outer raceways,
a radially inner ring provided with respective radially internal raceways,
two rows of rolling bodies positioned between the corresponding internal and external raceways, wherein the two rows of rolling bodies are held in position by corresponding flexible cages, the method for assembling the flexible cage inside the rolling bearing comprising steps of:
positioning the flexible cage from the axially internal side of the radially outer ring of the rolling bearing;
applying a circumferentially external force to the flexible cage to reduce the diameter ($\Phi$) of the circumference (C) that circumscribes the flexible cage;
inserting the flexible cage inside the radially outer ring through the minimum diameter (DK) of the radially outer ring;
positioning the flexible cage in a respective seat inside the radially outer ring;
removing the circumferentially external force so that the flexible cage returns to an original shape.

In yet another aspect, the method further comprises a step of:
applying a circumferentially external force to the fingers of the rib to reduce a diameter ($\Phi$) of a circumference (C) circumscribing the cage to a value lower than a minimum diameter (DK) of the radially outer ring.

BRIEF DESCRIPTION OF THE DRAWINGS

The invention will now be described with reference to the accompanying drawings which illustrate a number of non-limiting examples of embodiment thereof, in which.

DETAILED DESCRIPTION OF THE PRESENT INVENTION

Figures 1, 2, 3, 4:
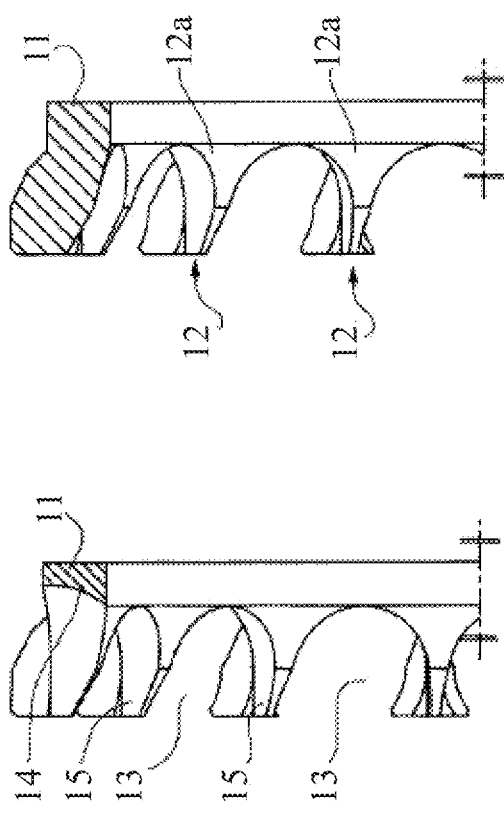
FIGS. 1 and 2 present cross-sections through a cage for rolling bearings according to the prior art.
FIGS. 3 and 4 present perspective views from two opposite sides showing the same cage shown in FIGS. 1 and 2.
Figure 6:
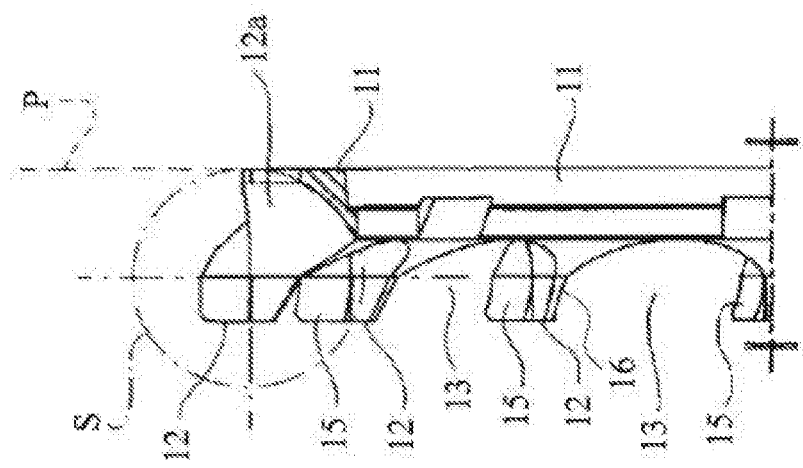
FIG. 6 presents a cross-section view taken through a second type of cage for rolling bodies according to the prior art.
Figure 5:
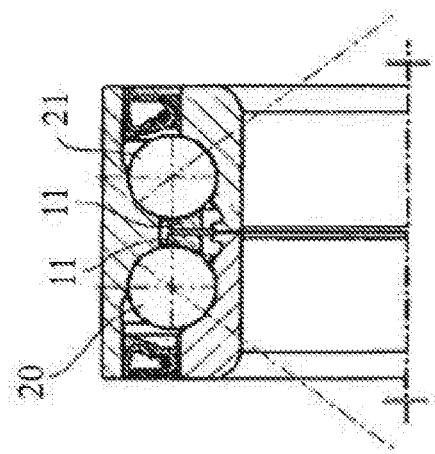
FIG. 5 presents a partial cross-section view taken through a rolling bearing provided with two cages for containing and retaining balls according to FIGS. 1-4.
Figure 7:
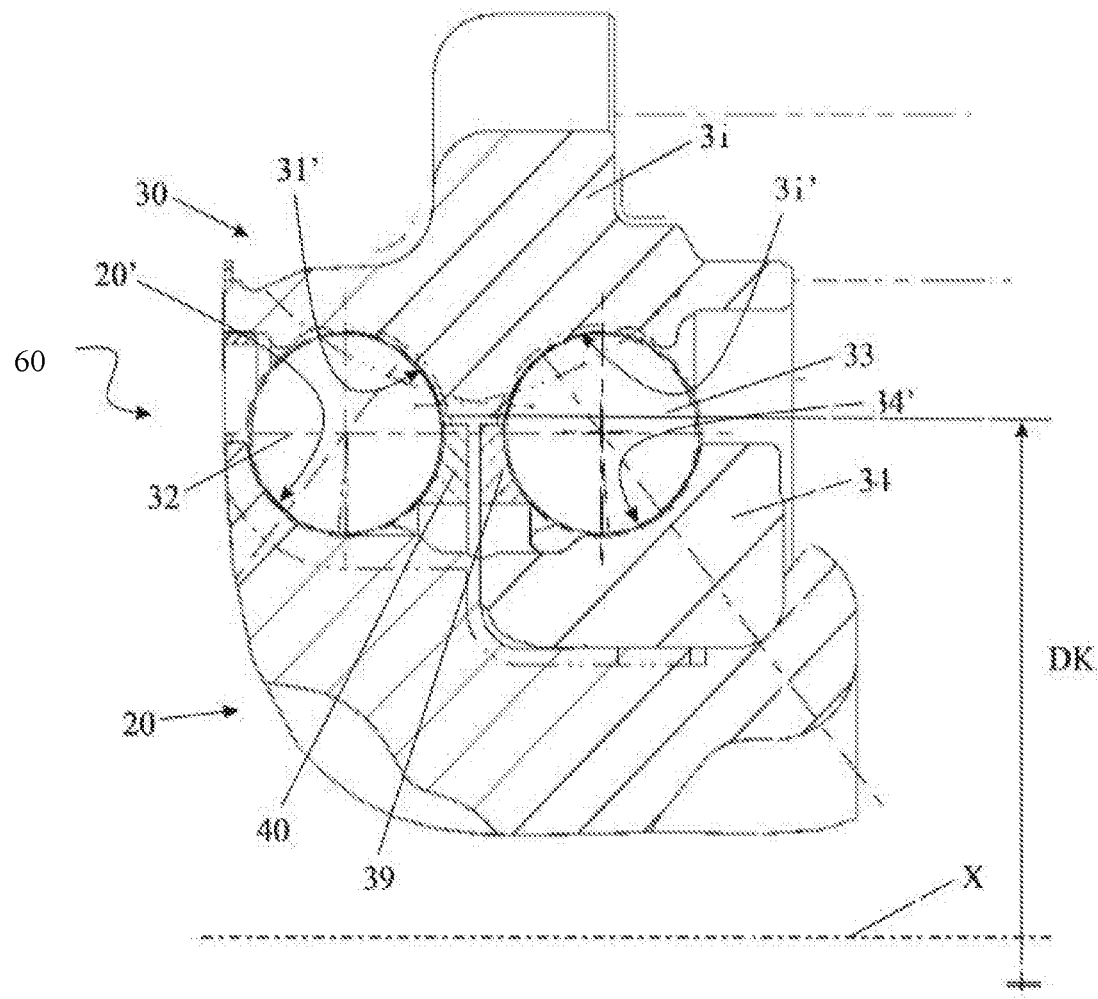
FIG. 7 presents a partial cross-section through a rolling bearing provided with two flexible cages for containing and retaining balls according to an embodiment of the present invention.

With reference now to FIG. 7, a wheel hub assembly according to a preferred embodiment of the invention is denoted overall by 60. The figure shows a detail of the configuration illustrated by way of example. As mentioned in the introduction, the invention is applicable not only to the configuration described below, but generally to any wheel hub assembly for motor vehicles.

The assembly 60 comprises a hub 20 which is preferably, but not necessarily, stationary and a bearing unit 30. The hub 20 is configured to assume also the function of a radially inner ring of the bearing. In the whole of the present description and in the claims, the terms and expression indicating positions and orientations such as "radial" and "axial" are understood as being in relation to the central axis of rotation X of the bearing unit 30. Expressions such as "axially outer" and "axially inner" relate instead to the mounted condition and, in the specific case, preferably are in relation to a wheel side and, respectively, to a side opposite to the wheel side.

The bearing unit 30 comprises a radially outer ring 31 which is preferably, but not necessarily, rotatable and provided with respective radially outer raceways 31', at least one radially inner ring 20, 34 which is stationary and provided with respective radially inner raceways 20', 34' and two rows of rolling bodies 32, 33, in this example balls. The row of axially outer rolling bodies 32 is arranged between the radially outer ring 31 and the hub 20 having the function of radially inner ring, while the row of axially inner rolling bodies 33 is arranged between the radially outer ring 31 and the radially inner ring 34. For the sake of easier illustration the reference numbers 32, 33 will be used to identify both the single balls and the rows of balls. Again for the sake of simplicity, the term "ball" may be used by way of example in the present description and in the attached drawings instead of the more generic term "rolling body" (and likewise the same reference numbers will be used). It will be understood always that, instead of balls, any other rolling body (for example, rollers, tapered rollers, needle rollers, etc.) may be used.

The rolling bodies of the rows 32, 33 are kept in position by corresponding cages 39, 40 of the innovative and so-called flexible type owing to the characteristic features which will be described below.

Figure 8:
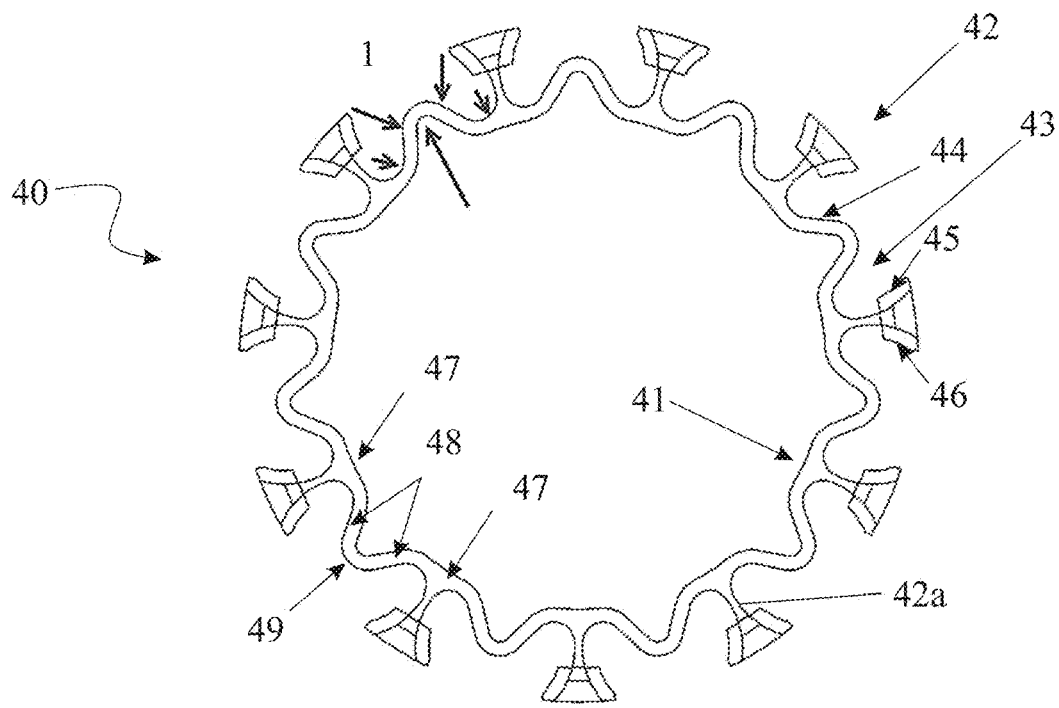
FIG. 8 presents a front view of a flexible cage according to another embodiment of the present invention.

The flexible cage according to an embodiment of the present invention is indicated in FIG. 8 by the reference number 40 and, in the example of embodiment described, is the axially outer cage. It is entirely evident that the same description of the cage 40 is likewise applicable to the axially inner cage 39. It is preferred to describe the axially outer cage since it is that cage which, during the operations for mounting in the bearing, must pass through the minimum overall diameter DK of the radially outer ring 31 in order to reach its axially outer position on the bearing.

The cage 40, which is obtained by means of molding from plastic material, is formed by a substantially circular base rib 41 and a plurality of circumferentially spaced fingers 42 which extend from one side of the rib 41, where the fingers 42 have a base portion 42a. The base rib 41 and the fingers 42 have partially spherical concave surfaces 44, 45, 46 having a smaller extension than the surfaces of the cages according to the prior art and defining together a plurality of partially spherical pockets or cavities 43 for retaining the respective balls (32 or 33 in FIG. 7).

As is known, the rib 41 is a continuous structural element which extends circumferentially along the cage and forms a solid base so as to provide the cage overall with the necessary rigidity for keeping the balls of each row circumferentially equally spaced along the raceways of the bearing. According to the design of the cage according to the invention it is envisaged, however, that the rib 41 has a greater flexibility associated with its geometrical form, while ensuring the overall rigidity thereof. As can be seen from FIG. 8, the rib 41 has substantially straight portions 47, each of which is integrally connected to a base portion 42a of a finger 42, substantially oblique portions 48 and protrusion portions 49. The portions are repeated in the sequence 47-48-49-48-47 etc., namely a straight portion 47 has integrally connected thereto an oblique portion 48, in turn integrally connected to a protrusion portion 49, the latter being integrally connected to another oblique portion 48. The oblique portion 48 is integrally connected to a new straight portion 47 and the sequence is repeated until the substantially circular form of the rib 41 is completed. Such a form provides the rib 41 with a significant degree of flexibility, especially at the points indicated by the arrows having the reference number 1.

Figure 9:
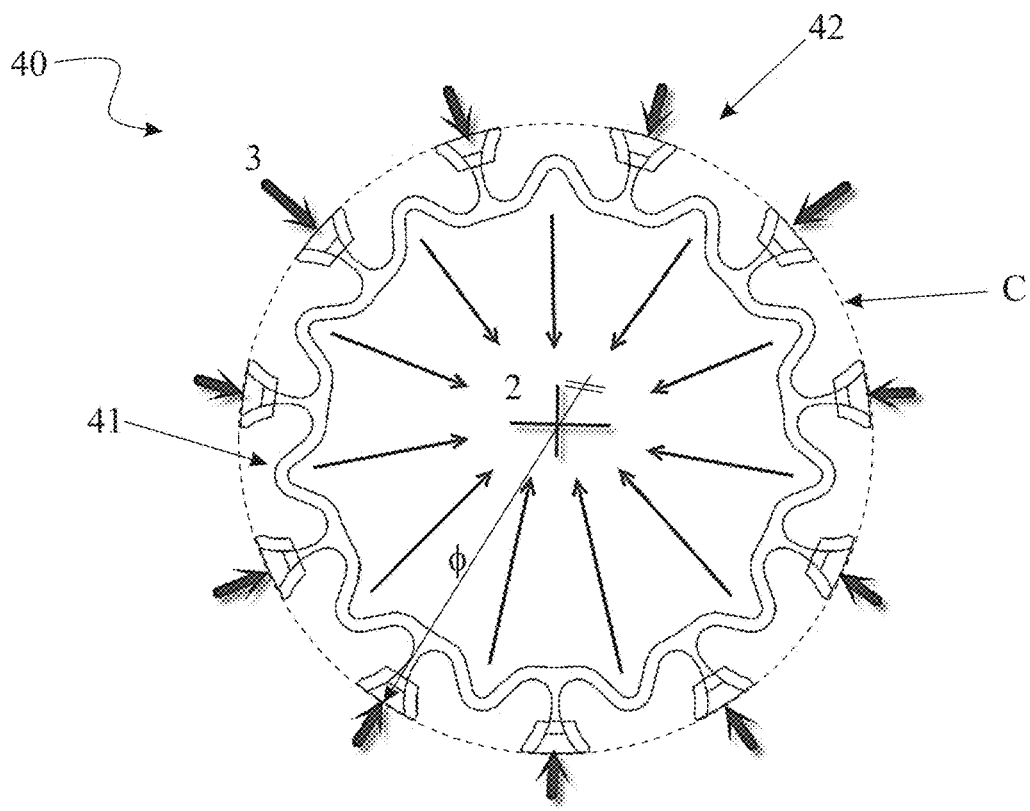
FIG. 9 presents a front view of the flexible cage originally introduced in FIG. 8 to which an external circumferential force is applied.

With reference to FIG. 9, the application of an external circumferential force, schematically indicated by the arrows 3 and applied to the fingers 42, owing to the flexibility of the rib 41 will cause a reduction of the diameter Φ of the circumference C which surrounds the cage 40. In other words, the cage 40 will be compressed towards its centre 2, so as to have overall a smaller circumferential volume.

Figure 10:
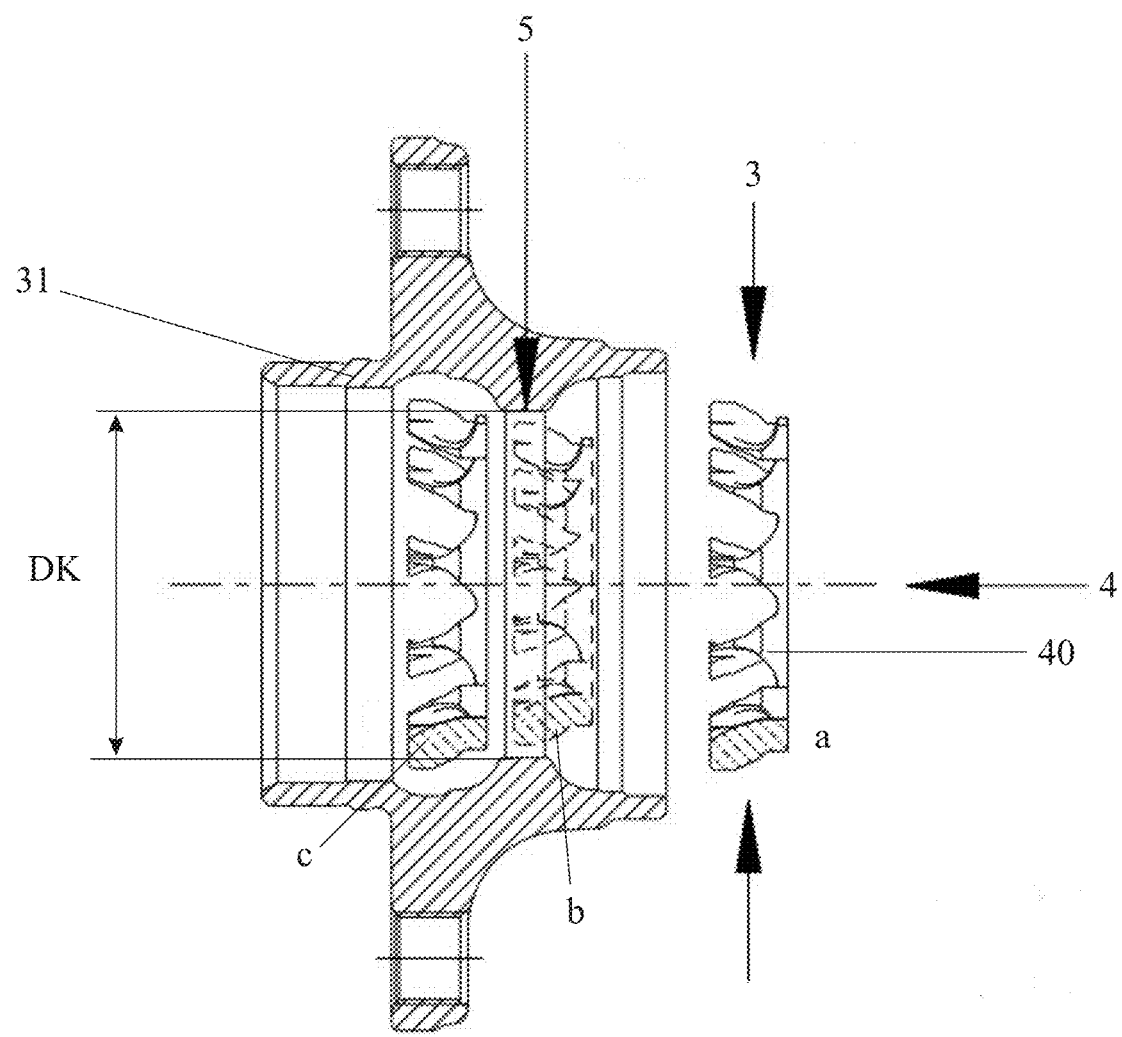
FIG. 10 presents a cross-section view taken through the flexible cage originally introduced in FIG. 8 and the axially outer rolling ring of the bearing during assembly of the cage inside the rolling bearing.

FIG. 10 shows in schematic form a possible application of the cage 40 according to the invention for mounting thereof inside the radially outer ring 31 in an axially outer position. Owing to its flexibility, the cage 40, which is mounted from the axially inner side, may pass through the minimum diameter DK of the radially outer ring 31.

In particular, the cage 40 is in an undeformed condition in the position indicated by the arrow 4 indicating the mounting condition inside the radially outer ring 31. In some applications, the diameter Φ of the circumference C, representing the maximum volume of the cage, may be greater than the minimum overall diameter DK of the radially outer ring 31, making it impossible to mount the cage from the axially inner side. According to the invention, instead, owing to the flexibility of the rib 41 and the circumferentially external force 3 applied onto the fingers 42, the diameter Φ of the circumference C is reduced and is smaller than the diameter DK of the radially outer ring 31. In FIG. 10 this can be seen when the cage is in the deformed configuration b which is able to pass through the narrower cross-section 5 of the diameter DK of the radially outer ring. Once the cage 40 is positioned in the seat, removal of the external circumferential force causes the cage to return to its original shape (configuration c in FIG. 10) and at this point it will be possible to perform standard mounting of the balls. In this way it is therefore possible to mount the cage 40 inside the radially inner ring from the axially inner side.

This innovative flexible cage offers numerous advantages: firstly it is possible to design rolling bearings which have symmetrical rows of rolling bodies, thereby avoiding negatively affecting the load capacity of the bearing; furthermore, the small areas of contact between rolling bodies and cage allow a further reduction in the friction to be achieved; the slim and flexible form of the cage also results in a reduction in the amount of plastic material used; and, finally, the flexible form of the cage facilitates greatly mounting of the cage.

In addition to the embodiments of the invention, as described above, it is to be understood that numerous further variants are possible. It must also be understood that the embodiments are only examples and do not limit the subject of the invention, nor its applications, nor its possible configurations. On the contrary, although the description provided above enables the person skilled in the art to implement the present invention at least in one of its examples of configuration, it must be understood that numerous variations of the components described are feasible, without thereby departing from the scope of the invention, as defined in the accompanying claims, interpreted literally and/or in accordance with their legal equivalents.

What is claimed is:

1. A wheel hub group for motor vehicles, comprising a hub and a rolling bearing comprising:
   a radially outer ring provided with respective radially outer raceways;
   a radially inner ring provided with respective radially internal raceways; and
   two rows of rolling bodies positioned between the corresponding internal and external raceways, the group being characterized in that the two rows of rolling bodies are held in position by corresponding flexible cages,
   wherein each flexible cage comprises:
   a substantially circular rib; and
   a plurality of fingers extending from a side of the rib and having a base portion, the rib and the plurality of fingers having partially spherical concave surfaces defining together a plurality of partially spherical cavities, each partially spherical cavity of a size and shape to retain a respective rolling body,
   wherein the substantially circular rib includes substantially straight portions, each substantially circular rib is steadily connected to a base portion of a respective finger of the plurality of fingers, substantially oblique portions and protrusion portions, and
   wherein the flexible cage has a diameter (Φ) of a circumference (C) circumscribing the flexible cage and the flexible cage is configured to reduce diameter (Φ) when an external force is applied to at least one finger of the plurality of fingers, and
   wherein the flexible cage is configured so that a circumferentially external force applied to the plurality of fingers of the rib reduces the diameter (Φ) of the circumference (C) circumscribing the cage to a value lower than a minimum diameter (DK) of the radially outer ring.

2. The wheel hub group for motor vehicles according to claim 1,
   wherein the substantially oblique portions and protrusion portions are positioned along the rib according to a predetermined series of elements,
   wherein a first element of the predetermined series of elements includes a first straight portion steadily connected to a first oblique portion of the oblique portions, the first oblique portion is steadily connected to a respective protrusion portion of the protrusion portions, the respective protrusion portion is steadily connected to a second oblique portion of the oblique portions and the second oblique portion is steadily connected to a second straight portion which starts a new element of the series of elements.

3. A method for assembling a flexible cage inside a rolling bearing belonging to a wheel hub group for motor vehicles, the flexible cage comprising:
   a substantially circular rib; and
   a plurality of fingers extending from a side of the rib and having a base portion, the rib and the plurality of fingers having partially spherical concave surfaces defining together a plurality of partially spherical cavities, each partially spherical cavity of a size and shape to retain a respective rolling body, and
   wherein the substantially circular rib includes substantially straight portions, each substantially circular rib is steadily connected to a base portion of a respective finger of the plurality of fingers, substantially oblique portions and protrusion portions,
   the wheel hub group comprising:
   a hub and a rolling bearing in turn comprising:
   a radially outer ring provided with respective radially outer raceways,
   a radially inner ring provided with respective radially internal raceways,
   two rows of rolling bodies positioned between the corresponding internal and outer raceways, wherein the two rows of rolling bodies are held in position by corresponding flexible cages,
   the method for assembling the flexible cage inside the rolling bearing comprising steps of:
   positioning the flexible cage from the axially internal side of the radially outer ring of the rolling bearing;
   applying a circumferentially external force to the flexible cage to reduce the diameter (Φ) of the circumference (C) that circumscribes the flexible cage;
   inserting the flexible cage inside the radially outer ring through the minimum diameter (DK) of the radially outer ring;
   positioning the flexible cage in a respective seat inside the radially outer ring; and
   removing the circumferentially external force so that the flexible cage returns to an original shape.

4. The method for assembling a flexible cage inside a rolling bearing belonging to a wheel hub group for motor vehicles according to claim 3, wherein the substantially oblique portions and protrusion portions are positioned along the rib according to a predetermined series of elements, wherein a first element of the predetermined series of elements includes a first straight portion steadily connected to a first oblique portion of the oblique portions, the first oblique portion is steadily connected to a respective protrusion portion of the protrusion portions, the respective protrusion portion is steadily connected to a second oblique portion of the oblique portions and the second oblique portion is steadily connected to a second straight portion which starts a new element of the series of elements.

5. The method for assembling a flexible cage inside a rolling bearing belonging to a wheel hub group for motor vehicles according to claim 3, further comprising a step of:
   applying a circumferentially external force to the fingers of the rib to reduce a diameter (Φ) of a circumference (C) circumscribing the cage to a value lower than a minimum diameter (DK) of the radially outer ring.

* * * * *